United States Patent
Yoshida

(10) Patent No.: US 9,948,817 B2
(45) Date of Patent: Apr. 17, 2018

(54) IMAGE FORMING APPARATUS

(71) Applicant: Sharp Kabushiki Kaisha, Sakai, Osaka (JP)

(72) Inventor: Mayuko Yoshida, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/298,358

(22) Filed: Oct. 20, 2016

(65) Prior Publication Data
US 2017/0118371 A1    Apr. 27, 2017

(30) Foreign Application Priority Data
Oct. 27, 2015    (JP) ................... 2015-210442

(51) Int. Cl.
*H04N 1/23*    (2006.01)
*H04N 1/00*    (2006.01)

(52) U.S. Cl.
CPC ....... *H04N 1/2338* (2013.01); *H04N 1/00411* (2013.01); *H04N 1/00424* (2013.01); *H04N 1/00474* (2013.01); *H04N 1/2346* (2013.01); *H04N 2201/0094* (2013.01)

(58) Field of Classification Search
CPC ..................................... H04N 1/2346
See application file for complete search history.

(56) References Cited

U.S. PATENT DOCUMENTS

2014/0019914 A1* 1/2014 Amano ............... G06F 3/0482
715/825

FOREIGN PATENT DOCUMENTS

JP    2007-181993 A    7/2007

* cited by examiner

*Primary Examiner* — Fan Zhang
(74) *Attorney, Agent, or Firm* — Keating & Bennett, LLP

(57) ABSTRACT

In an image forming apparatus, a controller allows selection of one from a first setting mode and a second setting mode at an operating portion. The first setting mode allows operating conditions to be set at the operating portion. The second setting mode allows only some of the operating conditions to be set at the operating portion. If the second setting mode is selected at the operating portion, an operating condition settable in the second setting mode is set, and then the first setting mode is selected at the operating portion, the controller makes a setting of the operating condition having been set while the second setting mode is selected reflect in an operating condition to be set in the first setting mode.

5 Claims, 11 Drawing Sheets

IMAGE FORMING APPARATUS

CROSS REFERENCE

This Nonprovisional application claims priority under 35 U.S.C. § 119(a) on Patent Application No. 2015-210442 filed in Japan on Oct. 27, 2015, the entire contents of which are hereby incorporated by reference.

BACKGROUND OF THE INVENTION

1. Field of the Invention

This invention relates to an image forming apparatus, more specifically, to a technique to be employed while an operating condition is set.

2. Description of Related Art

An image forming apparatus such as a multifunction machine has various functions including a copying function, a facsimile transmitting function, a scanning function, a printing function, and an image transmitting function, for example. The image forming apparatus permits setting an operating condition about each function. For example, the image forming apparatus permits setting a plurality of operating conditions about such as a copying density, a copying magnification, a copy count, and a sheet size about the copying function.

Such an operating condition is set on a setting screen displayed on a touch display panel, for example. More specifically, an icon prepared for each settable operating condition is displayed on the setting screen. If any icon is selected on the setting screen, a detailed setting screen for an operating condition corresponding to the selected icon is displayed and the operating condition is set on the detailed setting screen.

Development having made in recent years for higher performance of an image forming apparatus results in a tendency toward a larger number of operating conditions settable about each function such as a copying function. This makes it possible to set operating conditions in detail. This in turn produces a situation where an icon corresponding to an operating condition to be set with high frequency by a user and an icon corresponding to an operating condition to be set with low frequency by the user are displayed together on a setting screen. Hence, increase in the number of settable operating conditions makes operation on the setting screen troublesome, causing the problem of reduced operability.

According to a technique having been suggested to handle this problem, only an icon corresponding to an operating condition of high setting frequency can be displayed on a touch display panel, etc., as a simple setting screen separately from a normal setting screen on which all icons are displayed (see Japanese published unexamined patent application No. 2007-181993, for example).

According to the aforementioned technique, however, if there arises a need to set an operating condition (operating condition of low setting frequency) that cannot be set on the simple setting screen after or while an operating condition is set on the simple setting screen, a user is required to return to the normal setting screen and is forced to perform troublesome operation. Specifically, when the user returns to the normal setting screen, each setting of an operating condition having been set on the simple setting screen is reset to force the user to set the operating condition again on the normal setting screen. Hence, high operability has not yet been achieved by the aforementioned suggested technique.

SUMMARY OF THE INVENTION

An image forming apparatus according to this invention has at least one function and permits setting a plurality of operating conditions about the function. The image forming apparatus includes: an operating portion used for operation for setting the operating conditions; an image processor that performs image processing in a manner that depends on a setting of an operating condition set at the operating portion; and a controller that controls the operating portion and the image processor. The controller performs processes (i) and (ii). In the process (i), the controller allows selection of one from a first setting mode and a second setting mode at the operating portion. The first setting mode allows the operating conditions to be set at the operating portion. The second setting mode allows only some of the operating conditions to be set at the operating portion. In the process (ii), the controller makes a setting of an operating condition having been set while the second setting mode is selected reflect in an operating condition to be set in the first setting mode, if the second setting mode is selected at the operating portion, the operating condition settable in the second setting mode is set, and then the first setting mode is selected at the operating portion.

DETAILED DESCRIPTION OF THE EMBODIMENTS

[1] First Embodiment

[1-1] Structure of Image Forming Apparatus

Figure 1:
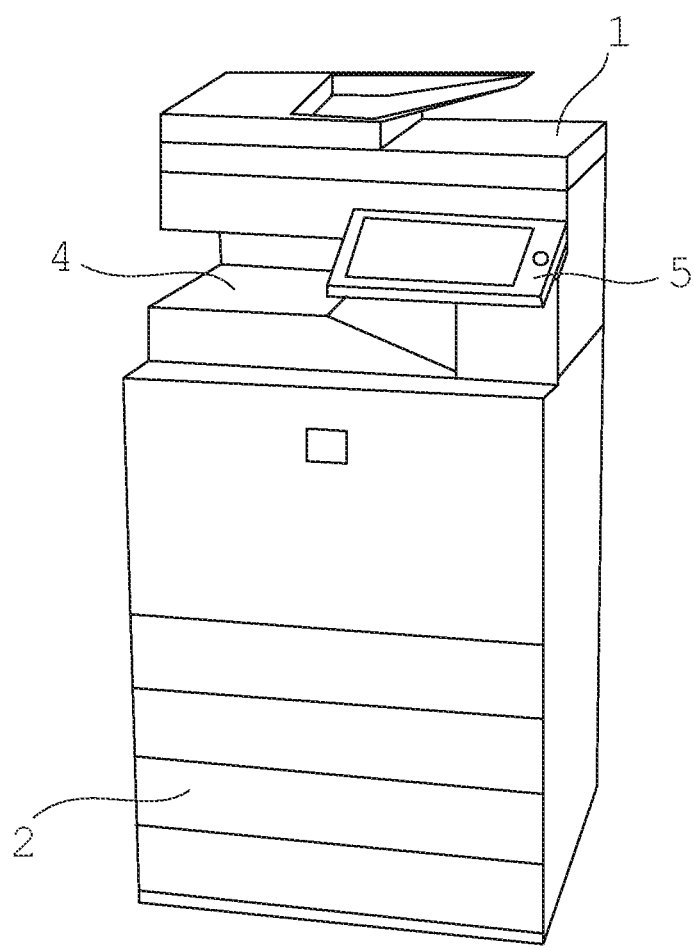
FIG. 1 is a perspective view conceptually showing an image forming apparatus according to embodiments of this invention.
Figure 2:
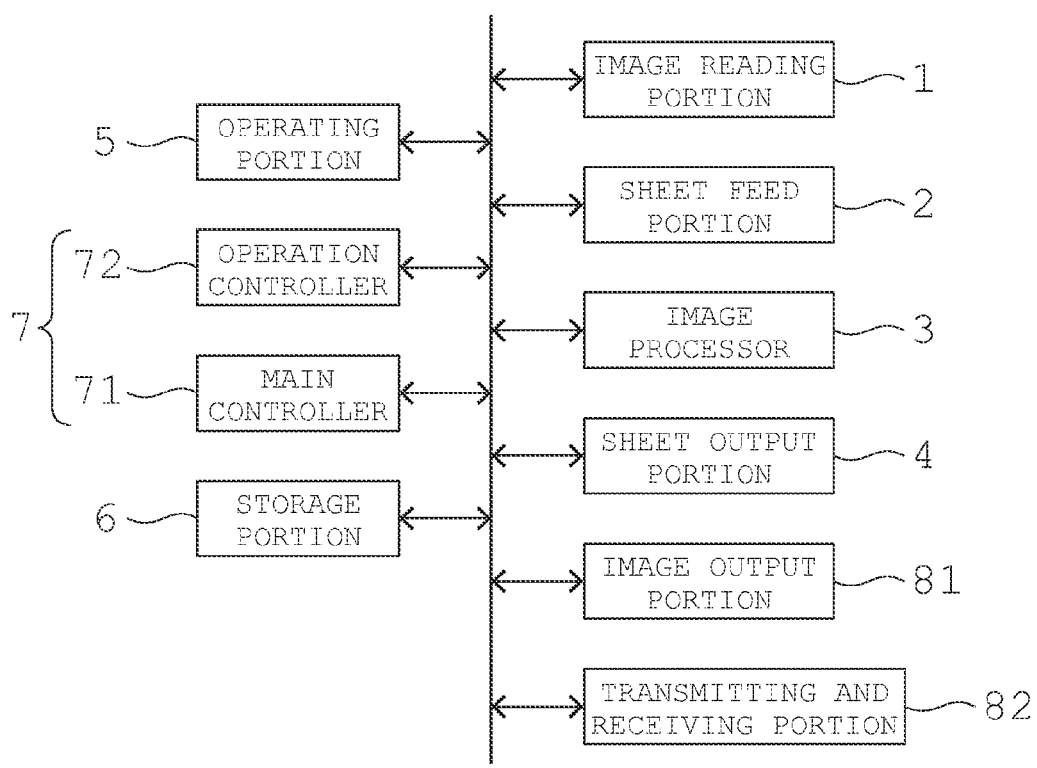
FIG. 2 is a block diagram of the image forming apparatus.

As shown in FIGS. 1 and 2, an image forming apparatus includes an image reading portion 1, a sheet feed portion 2, an image processor 3, a sheet output portion 4, an operating portion 5, a storage portion 6, a controller 7, an image output portion 81, and a transmitting and receiving portion 82. The image forming apparatus of this embodiment is a multifunction machine having various functions (copying function, facsimile transmitting function, scanning function, printing function, image transmitting function, etc.). The image forming apparatus permits setting a plurality of operating conditions for each of the functions. These operating conditions include various types of conditions such as a copying density, a copying magnification, a copy count, and a sheet size that are settable about the copying function, and a destination that is settable about the facsimile transmitting function, for example.

The image reading portion 1 generates image data by optically reading an image of a document loaded on a document platen. The image reading portion 1 may have an automatic document feeding mechanism.

The image data generated by the image reading portion 1 is input to the image processor 3. Image data input to the image processor 3 is not limited to the image data generated by the image reading portion 1 but may include image data acquired by the transmitting and receiving portion 82 from an external connected device through a network, etc.

The image processor 3 performs various types of image processing such as a correction process and a filtering process on image data in a manner that depends on a selected function and a setting of an operating condition. The image data after being subjected to the image processing is input to the image output portion 81 if the copying function or the printing function is selected, and is input to the transmitting and receiving portion 82 if the facsimile transmitting function, the scanning function, or the image transmitting function is selected.

The image output portion 81 performs an image forming process of an electrophotographic system based on image data input to the image output portion 81 and prints an image on a sheet fed from the sheet feed portion 2. The sheet including the printed image is output to the sheet output portion 4. A sheet is not limited to a sheet made from paper such as plain paper or photographic paper but includes a sheet made from a resin material such as an OHP film and sheets made from various other materials.

The transmitting and receiving portion 82 transmits and receives image data through a network. More specifically, the transmitting and receiving portion 82 has a function of receiving the image data from an external connected device such as a personal computer and a function of transmitting the image data to the external connected device. As an example of the transmission, the transmitting and receiving portion 82 transmits the image data having been input from the image processor 3 to the external connected device through a network, for example.

Figure 3:
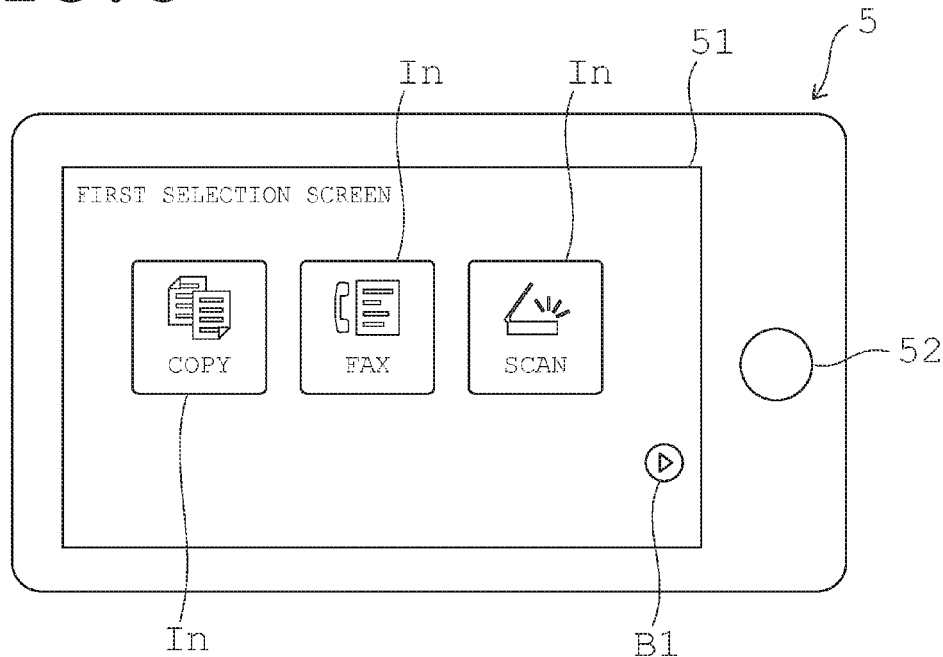
FIG. 3 is a conceptual view showing a first selection screen displayed on a touch display panel.

As shown in FIG. 3, the operating portion 5 includes a touch display panel 51 and a capacitive touch button 52, and functions as a user interface. Specifically, the operating portion 5 has a function as an input portion to receive an operational command from a user, and a function as a display portion to provide the user with information such as a setting screen and an operating condition. Examples of a screen to be displayed on the touch display panel 51 include a selection screen used for operation of selecting a function to be fulfilled by the image forming apparatus and a setting screen used for operation of setting an operating condition. The operating portion 5 may be formed only of either the touch display panel 51 or the capacitive touch button 52. The capacitive touch button 52 may include a plurality of capacitive touch buttons 52.

The storage portion 6 stores data such as a set value of a control parameter to be used for control on each portion of the image forming apparatus. The storage portion 6 further stores data such as image data for a setting screen to be displayed on the touch display panel 51. The controller 7 controls each portion of the image forming apparatus in a manner that depends on a function selected at the operating portion 5 and a setting of an operating condition set at the operating portion 5. More specifically, the controller 7 reads data such as a set value of a control parameter from the storage portion 6 that can satisfy a setting of an operating condition set at the operating portion 5, and controls each portion of the image forming apparatus based on the read data such as the set value. The controller 7 includes a main controller 71 responsible for overall control on the image forming apparatus, and an operation controller 72 mainly responsible for control on the operating portion 5.

Various types of control processors such as a central processing unit (CPU) and a microcomputer are applicable as each of the main controller 71 and the operation controller 72. A process to be performed by each of the main controller 71 and the operation controller 72 may be realized by making the image processing apparatus or the operating portion 5 execute a series of corresponding programs. Such programs may be stored in a storage medium (such as a flash memory, for example) in a state of being readable by the storage medium, or may be stored in the storage portion 6.

[1-2] Control on Image Forming Apparatus

The following describes how the controller 7 executes control in the image forming apparatus. The following detailed description is mainly intended for control executed by the operation controller 72 and relating to selection of a function to be fulfilled by the image forming apparatus and setting of an operating condition.

As shown in FIG. 3, the operation controller 72 makes the touch display panel 51 display a first selection screen. The first selection screen is a screen to be used if a user hopes to perform normal setting operation. The first selection screen includes an icon In prepared for each function of the image forming apparatus and with which a normal setting screen about this function is to be displayed. On the first selection screen shown in FIG. 3, the icon In corresponds to each of the copying function, the facsimile transmitting function (in FIG. 3, "facsimile transmission" is abbreviated as "FAX"), and the scanning function. The first selection screen may display icons In corresponding to various functions not limited to these functions.

Figure 4:
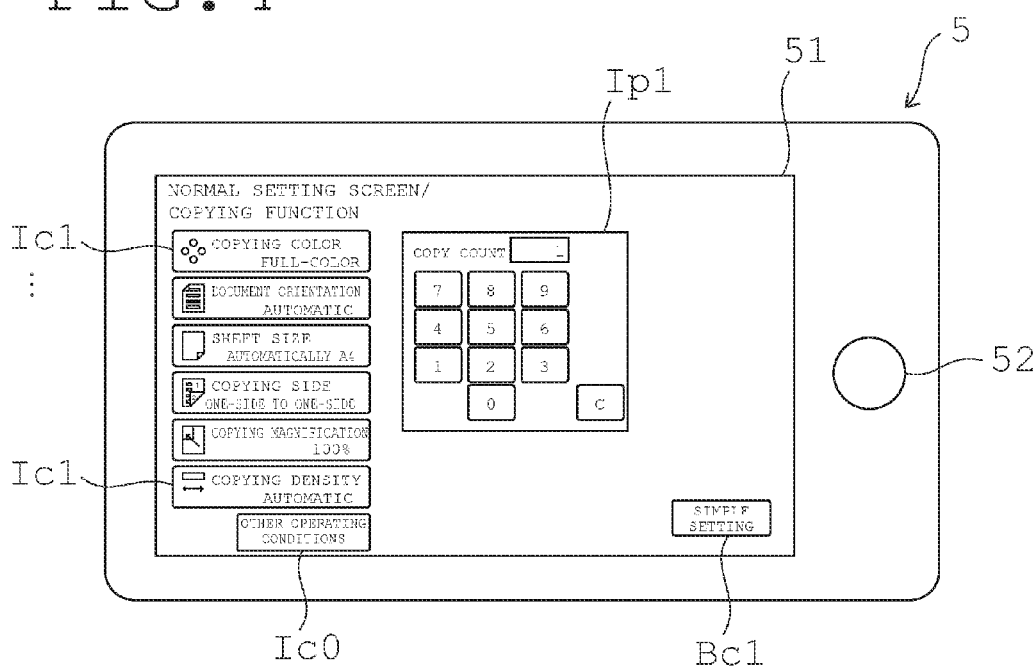
FIG. 4 is a conceptual view showing a normal setting screen about a copying function.

If any of the icons In is selected on the first selection screen, the operation controller 72 makes the touch display panel 51 display a normal setting screen about a function corresponding to the selected icon In, as shown in FIG. 4. The normal setting screen mentioned herein is a screen that allows many operating conditions about a target function to be set. The displayed normal setting screen includes an icon Ic1 prepared for each settable operating condition and with which a detailed setting screen about this operating condition is to be displayed, and a setting image Ip1 with which the operating condition is to be set by means of an entry, for example.

FIG. 4 shows a screen that is displayed as the normal setting screen if the icon In corresponding to the copying function is selected on the first selection screen (see FIG. 3). On this normal setting screen, the setting image Ip1 is an image with which a copy count can be set (numerical value can be entered), and the icon Ic1 corresponds to each operating condition of relatively high setting frequency except a copy count. The icon Ic1 shown in FIG. 4 is prepared for each of a copying color, a document orientation, a sheet size, a copying side, a copying magnification, and a copying density. Icons Ic1 corresponding to operating conditions except these operating conditions are aggregated into one icon Ic0 labeled "other operating conditions."

If any of the icons Ic1 is selected on the normal setting screen (including the case where the icon Ic0 is selected and then any of the icons Ic1 aggregated into the icon Ic0 is selected), the operation controller 72 makes the touch display panel 51 display a detailed setting screen for an operating condition corresponding to the selected icon Ic1. The operation controller 72 makes this detailed setting screen operable by a user for performing operation relating to condition setting at the touch display panel 51 such as selection of a setting from a plurality of predetermined selection items or entry of a numerical value or a character, etc. A setting of an operating condition having been set on the detailed setting screen is indicated in the corresponding icon Ic1 on the normal setting screen. Before an operating condition is set, a setting of each operating condition agrees with a predetermined default setting and the default setting of each operating condition (such as "full-color" or "automatically A4", see FIG. 4) is indicated in a corresponding icon Ic1.

Figure 5:
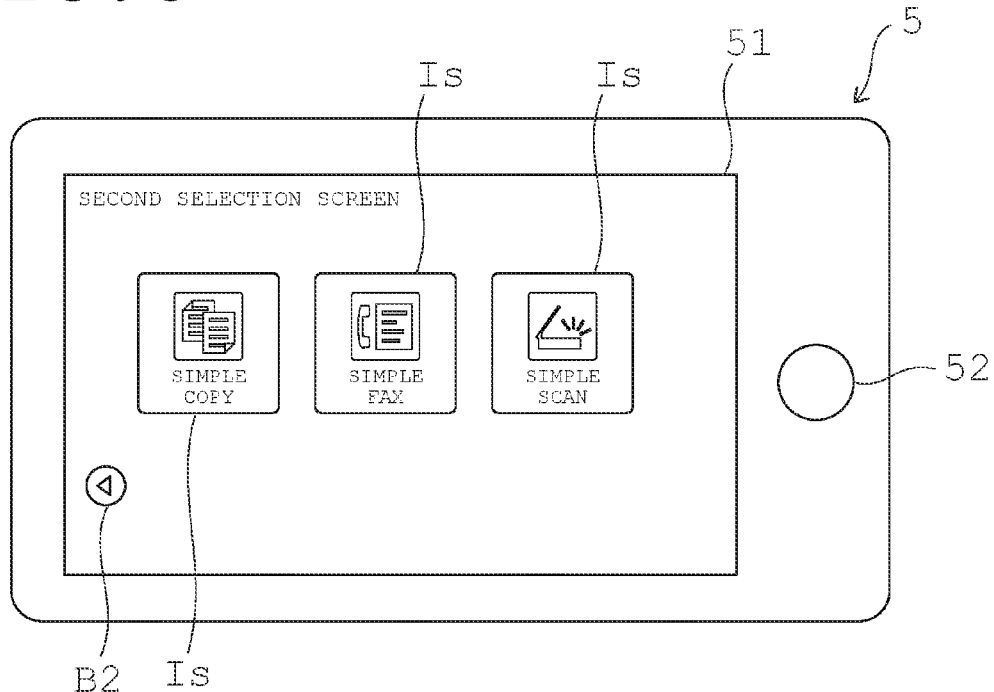
FIG. 5 is a conceptual view showing a second selection screen displayed on the touch display panel.

As shown in FIG. 3, the displayed first selection screen includes a button B1 with which a display screen at the touch display panel 51 is to be switched from the first selection screen to a second selection screen, in addition to the icons In. If the button B1 is selected on the first selection screen, the operation controller 72 makes the touch display panel 51 display the second selection screen, as shown in FIG. 5. The second selection screen is a screen to be used if a user hopes to perform simple setting operation. The second selection screen includes an icon Is prepared for each function of the image forming apparatus and with which a simple setting screen about this function is to be displayed. On the second selection screen shown in FIG. 5, the icon Is corresponds to each of the copying function, the facsimile transmitting function (in FIG. 5, "facsimile transmission" is abbreviated as "FAX"), and the scanning function. The second selection screen may display Icons Is corresponding to various functions not limited to these functions.

Figure 6:
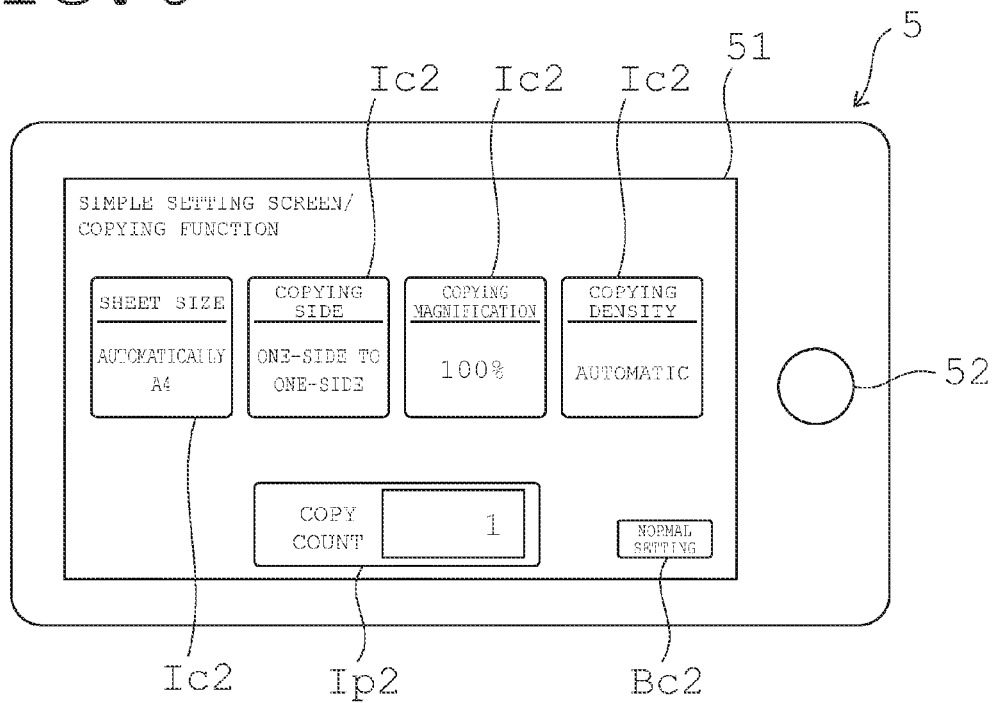
FIG. 6 is a conceptual view showing a simple setting screen about a copying function.

If any of the icons Is is selected on the second selection screen, the operation controller 72 makes the touch display panel 51 display a simple setting screen about a function corresponding to the selected icon Is, as shown in FIG. 6. The simple setting screen mentioned herein is a screen that allows only some of operating conditions about a target function to be set. The displayed simple setting screen includes an icon Ic2 prepared for each settable operating condition and with which a detailed setting screen about this operating condition is to be displayed, and a setting image Ip2 with which the operating condition is to be set by means of entry, for example. As an example, the icon Ic2 displayed on the simple setting screen corresponds to an operating condition to be set with high frequency by a user.

FIG. 6 shows a screen that is displayed as the simple setting screen if the icon Is corresponding to the copying function is selected on the second selection screen (see FIG. 5). On this simple setting screen, the setting image Ip2 is an image with which a copy count can be set (numerical value can be entered), and the icon Ic2 corresponds to each operating condition except a copy count. The displayed simple setting screen shown in FIG. 6 includes only the icon Ic2 corresponding to each of the four operating conditions including a sheet size, a copying side, a copying magnification, and a copying density. Icons Ic2 corresponding to various operating conditions except these operating conditions may be displayed on the simple setting screen.

On the simple setting screen (see FIG. 6), to enhance the visibility of the icon Ic2, the icon Ic2 is displayed in a larger size than the icon Ic1 displayed on the normal setting screen (see FIG. 4). On the simple setting screen, to facilitate entry of a numerical value into the setting image Ip2, an entry field of the setting image Ip2 is displayed in a larger size than an entry field of the setting image Ip1 displayed on the normal setting screen. If a position corresponding to the entry field of the setting image Ip2 is touched, a numerical keypad for entry of a numerical value is displayed as a part of the setting image Ip2 at the touch display panel 51 to allow entry of a numerical value into this entry field.

If any of the icons Ic2 is selected on the simple setting screen, the operation controller 72 makes the touch display panel 51 display a detailed setting screen for an operating condition corresponding to the selected icon Ic2. The operation controller 72 makes this detailed setting screen operable by a user for performing operation relating to condition setting at the touch display panel 51 such as selection of a setting from a plurality of predetermined selection items or entry of a numerical value or a character, etc. A setting of an operating condition having been set on the detailed setting screen is indicated in the corresponding icon Ic2 on the simple setting screen. Before an operating condition is set, a setting of each operating condition agrees with a predetermined default setting and the default setting of each operating condition (such as "automatically A4" or "one-side to one-side," see FIG. 6) is indicated in a corresponding icon Ic2.

As shown in FIG. 5, the displayed second selection screen includes a button B2 with which a display screen at the touch display panel 51 is to be switched from the second selection screen to the first selection screen, in addition to the icons Is. If the button B2 is selected on the second selection screen, the operation controller 72 makes the touch display panel 51 display the first selection screen (see FIG. 3).

As described above, the operation controller 72 allows selection of one from a first setting mode and a second setting mode described below at the touch display panel 51. The first setting mode allows many operating conditions to be set about each function at the touch display panel 51. The second setting mode allows only some of the operating conditions to be set at the touch display panel 51. A state of the first setting mode is realized on the normal setting screen displayed on the touch display panel 51. A state of the second setting mode is realized on the simple setting screen displayed on the touch display panel 51.

In addition to realizing these two modes, the operation controller 72 allows shift of a mode between the first and second setting modes for setting an operating condition about each function. More specifically, the operation controller 72 allows shift of a screen between the normal setting screen and the simple setting screen about each function.

To be more specific, as shown in FIG. 4, the displayed normal setting screen includes a button Bc1 with which a display screen is to be switched to the simple setting screen about a target function. If the button Bc1 is selected on the normal setting screen, the operation controller 72 switches a display screen at the touch display panel 51 to the simple setting screen (see FIG. 6). As shown in FIG. 6, the displayed simple setting screen includes a button Bc2 with which a display screen is to be switched to the normal setting screen about a target function. If the button Bc2 is selected on the simple setting screen, the operation controller 72 switches a display screen at the touch display panel 51 to the normal setting screen (see FIG. 4).

In addition to allowing the shift between the aforementioned modes, the operation controller 72 further performs the following process. Specifically, if an operating condition is set on the simple setting screen (see FIG. 6) and then the button Bc2 is selected on this simple setting screen to shift a display screen to the normal setting screen, the operation controller 72 makes a setting of the operating condition having been set on the simple setting screen reflect in a corresponding one of operating conditions settable on the normal setting screen, as shown in FIGS. 7A and 7B.

Figure 7A:
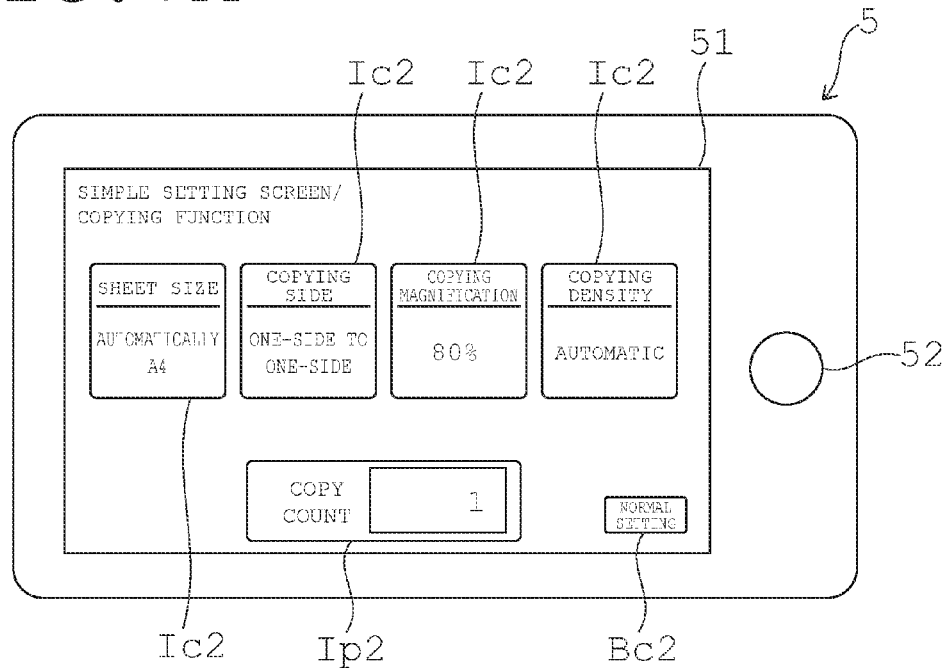
FIGS. 7A and 7B are conceptual views showing a simple setting screen and a normal setting screen respectively illustrated in relation to a process performed by an operation controller in a first embodiment.
Figure 7B:
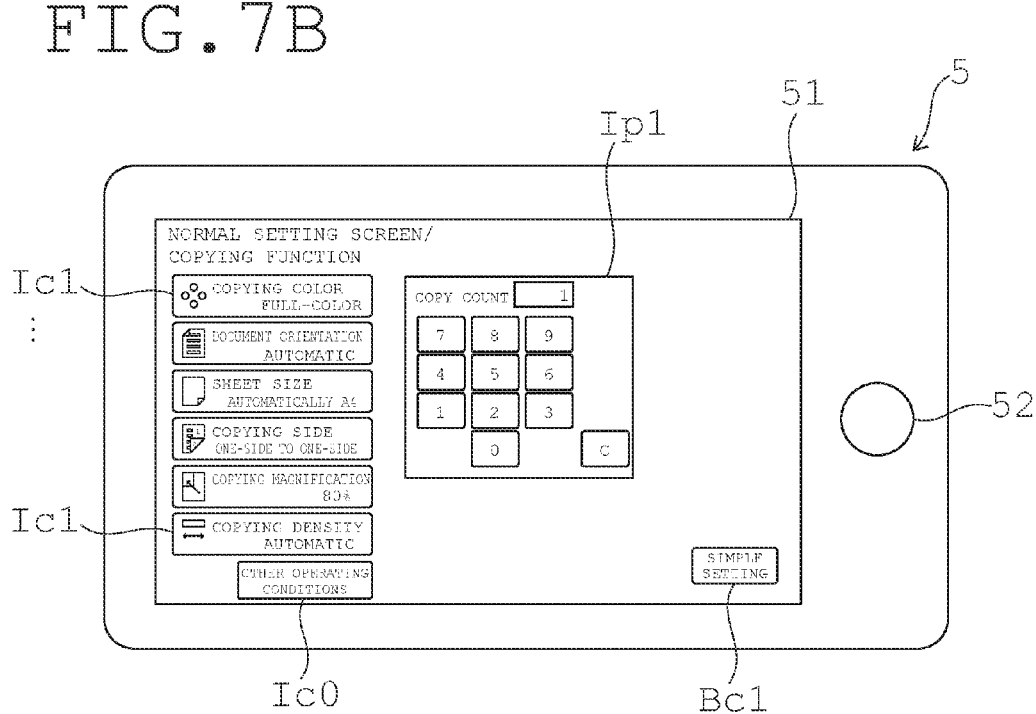

FIG. 7A shows an instance where a copying magnification is set at 80% (regarding the other operating conditions, default settings remain unchanged) on the simple setting screen. FIG. 7B shows an instance where a display screen is switched to the normal setting screen after the operating condition is set on the simple setting screen. As shown in FIGS. 7A and 7B, a setting indicated in the icon Ic1 corresponding to a copying magnification on the normal setting screen (see FIG. 7B) is 80%, which agrees with a setting indicated in the icon Ic2 corresponding to a copying magnification on the simple setting screen (see FIG. 7A). This shows that the setting is reflected in the normal setting screen.

The aforementioned process performed by the operation controller 72 can be understood as follows in terms of a relationship between the first and second setting modes. Specifically, if the second setting mode is selected at the touch display panel 51, an operating condition settable in the second setting mode is set, and then the first setting mode is selected at the touch display panel 51, the operation controller 72 makes a setting of the operating condition having been set while the second setting mode is selected reflect in a corresponding one of operating conditions settable in the first setting mode.

According to the aforementioned process by the operation controller 72, even if a display screen is switched to the normal setting screen after or while an operating condition is set on the simple setting screen, a setting of the operating condition having been set previously is not reset but is reflected in a corresponding one of operating conditions settable on the normal setting screen. Thus, after the shift to the normal setting screen, a user is not required to set the operating condition at a setting again same as that of the operating condition having been set on the simple setting screen. This achieves high operability in the image forming apparatus in terms of setting an operating condition.

[2] Second Embodiment

Figure 8:
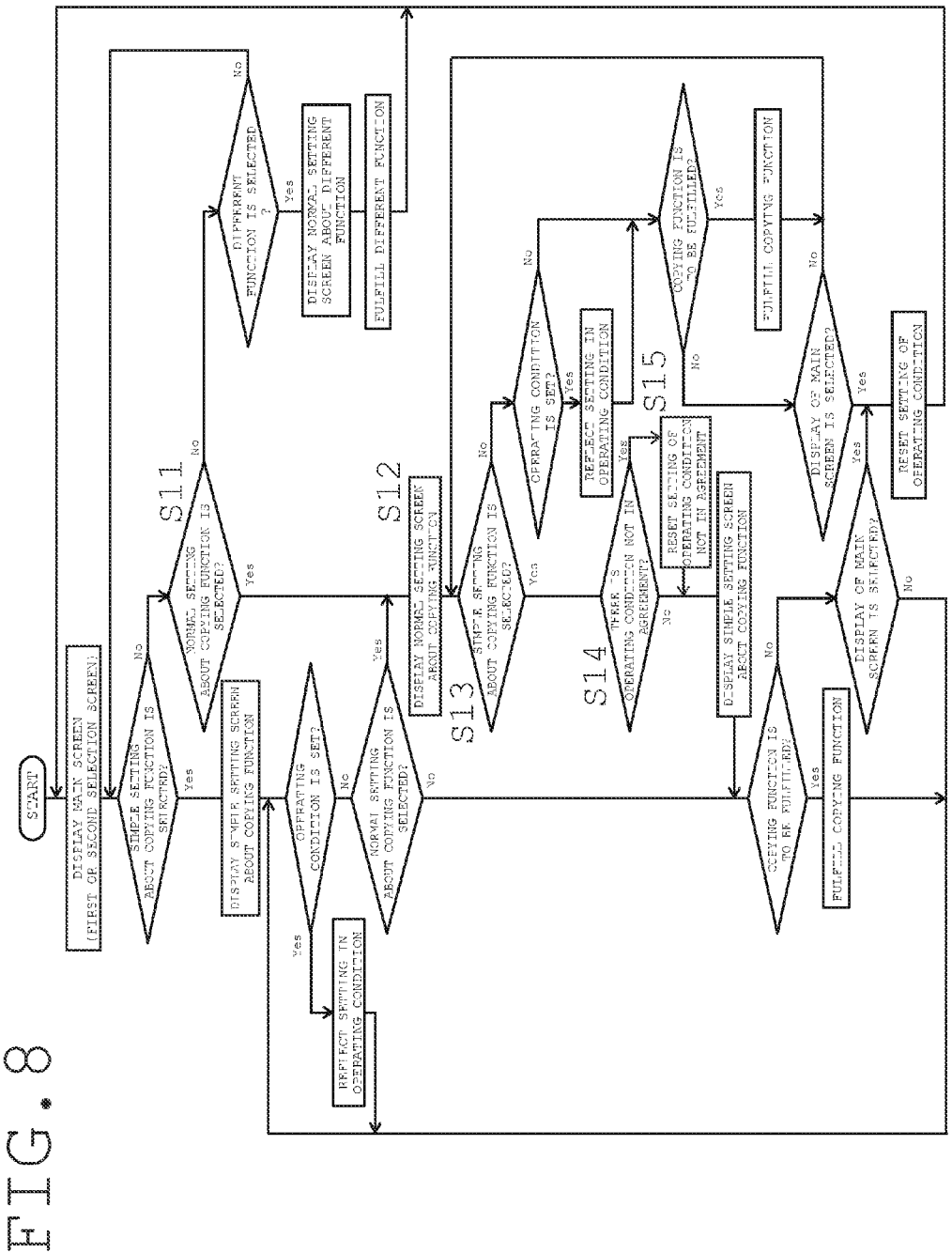
FIG. 8 is a flowchart showing a process performed by a controller in a second embodiment.

In the aforementioned image forming apparatus, the controller 7 including the operation controller 72 may perform a process shown in FIG. 8. Specifically, if an operating condition is set on the normal setting screen (see FIG. 4) (steps S11 and S12 of FIG. 8) and then the button Bc1 is selected on this normal setting screen to shift a display screen to the simple setting screen (if a determination result of step S13 of FIG. 8 is "Yes"), regarding an operating condition to be set in the simple setting screen, the operation controller 72 makes a setting of a corresponding operating condition of the operating condition having been set on the normal setting screen reflect in the operating condition to be set on the simple setting screen (execution of steps S14 and S15 of FIG. 8). At this time, if there is an operating condition with a setting having been set on the normal setting screen and not reflected in the simple setting screen (operating condition not in agreement), the operation controller 72 resets this setting and returns this setting to a default setting (step S15 of FIG. 8).

Figure 9A:
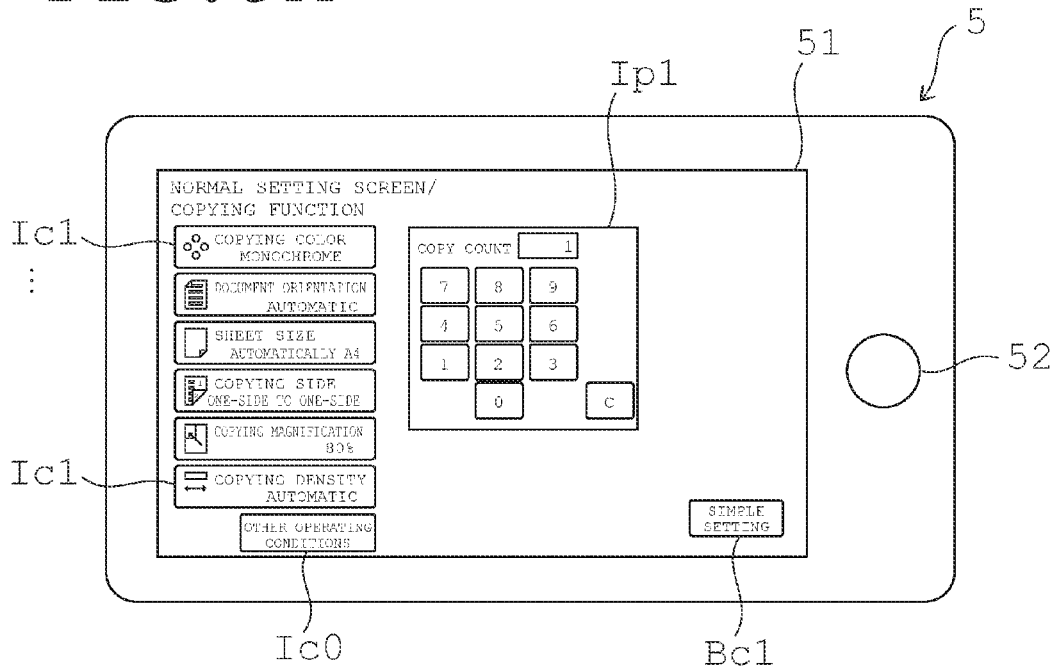
FIGS. 9A and 9B are conceptual views showing a normal setting screen and a simple setting screen respectively illustrated in relation to a process performed by the operation controller in the second embodiment.
Figure 9B:
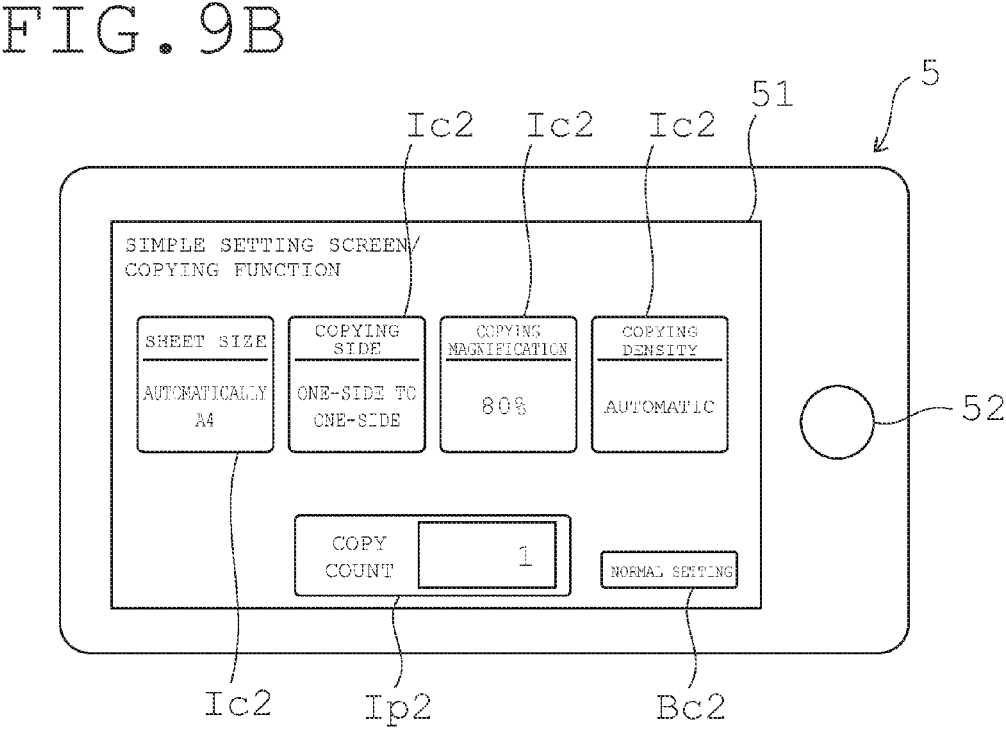

FIG. 9A shows an instance where a copying magnification is set at 80% and a copying color is set at monochrome on the normal setting screen. FIG. 9B shows an instance where a display screen is switched to the simple setting screen after the operating conditions are set on the normal setting screen. As shown in FIGS. 9A and 9B, a setting indicated in the icon Ic2 corresponding to a copying magnification on the simple setting screen (see FIG. 9B) is 80%, which agrees with a setting indicated in the icon Ic1 corresponding to a copying magnification on the normal setting screen (see FIG. 9A). This shows that the setting is reflected in the simple setting screen. At this time, a setting for a copying color is returned to full-color, which is a default setting.

The aforementioned process performed by the operation controller 72 can be understood as follows in terms of a relationship between the first and second setting modes. Specifically, if the first setting mode is selected at the touch display panel 51, an operating condition settable in the first setting mode is set, and then the second setting mode is selected at the touch display panel 51, regarding an operating condition to be set in the second setting mode, the operation controller 72 makes a setting of a corresponding operating condition of the operating condition having been set while the first setting mode is selected reflect in the operating condition to be set in the second setting mode.

According to the aforementioned process by the operation controller 72, if a display screen is switched to the simple setting screen after or while an operating condition is set on the normal setting screen, a setting of the operating condition having been set previously and not settable on the simple setting screen is reset and is returned to a default setting. In the case where this setting remains without being reset, even if this setting deviates from a setting intended by a user while an operating condition is set on the simple setting screen, the user cannot set the operating condition again and is forced to return to the normal setting screen. If the user makes the image forming apparatus perform operation such as copying without returning to the normal setting screen while leaving this setting as it is, the image forming apparatus is to operate under an operating condition deviating from user's intention. By contrast, according to the aforementioned process of the second embodiment, a setting of an operating condition having been set on the normal setting screen and not settable on the simple setting screen is reset and is returned to a standard (default setting). This prevents the image forming apparatus from operating in a manner largely deviating from user's intention. Additionally, a user becomes free from troublesome operation of resetting a setting intentionally after making a shift to the simple setting screen.

Additionally, according to the aforementioned process by the operation controller 72, if a display screen is switched to the simple setting screen, a setting of an operating condition having been set on the normal setting screen and settable also on the simple setting screen is reflected in a corresponding operating condition on the simple setting screen. Thus, even if a user shifts a display screen to the simple setting screen for the purpose of avoiding complicated operation to be involved after or while an operating condition is set on the normal setting screen, the user is not required to set the operating condition at a setting again same as that of the operating condition having been set on the normal setting screen. Further, where necessary, the user can check and correct a setting easily.

As a result, high operability is achieved in the image forming apparatus in terms of setting an operating condition.

[3] Third Embodiment

Figure 10:
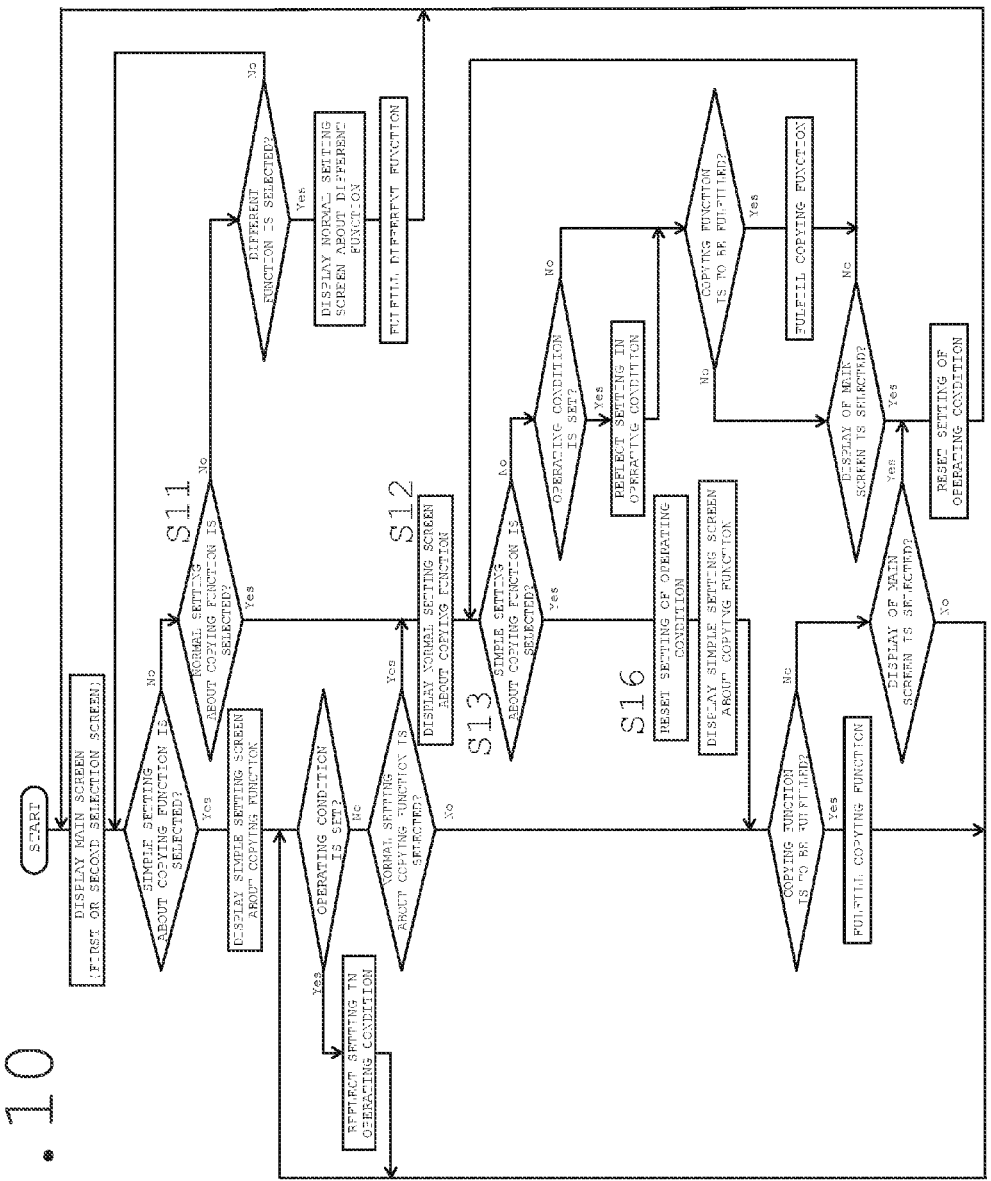
FIG. 10 is a flowchart showing a process performed by the controller in a third embodiment.

In the image forming apparatus of the second embodiment, the controller 7 including the operation controller 72 may perform a process shown in FIG. 10. Specifically, if a display screen is switched from the normal setting screen to the simple setting screen, the operation controller 72 may reset each setting of an operating condition having been set on the normal setting screen without reflecting this setting in the simple setting screen, even if operating conditions having been set on the normal setting screen include an operating condition settable on the simple setting screen (step S16 of FIG. 10), as shown in FIGS. 11A and 11B.

Figure 11A:
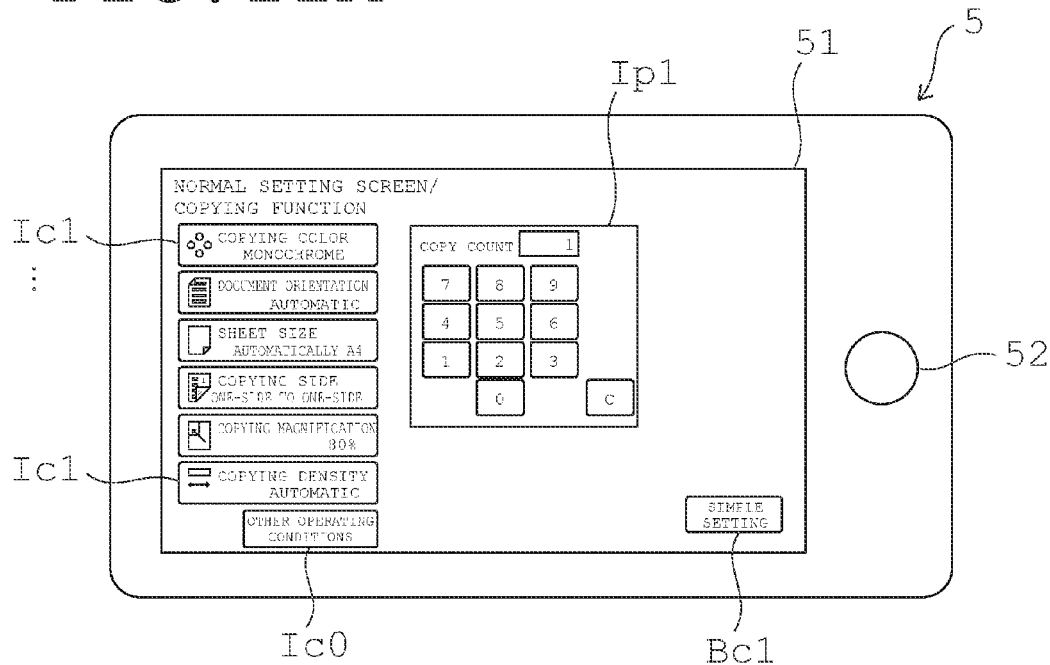
FIGS. 11A and 11B are conceptual views showing a normal setting screen and a simple setting screen respectively illustrated in relation to a process performed by the operation controller in the third embodiment.
Figure 11B:
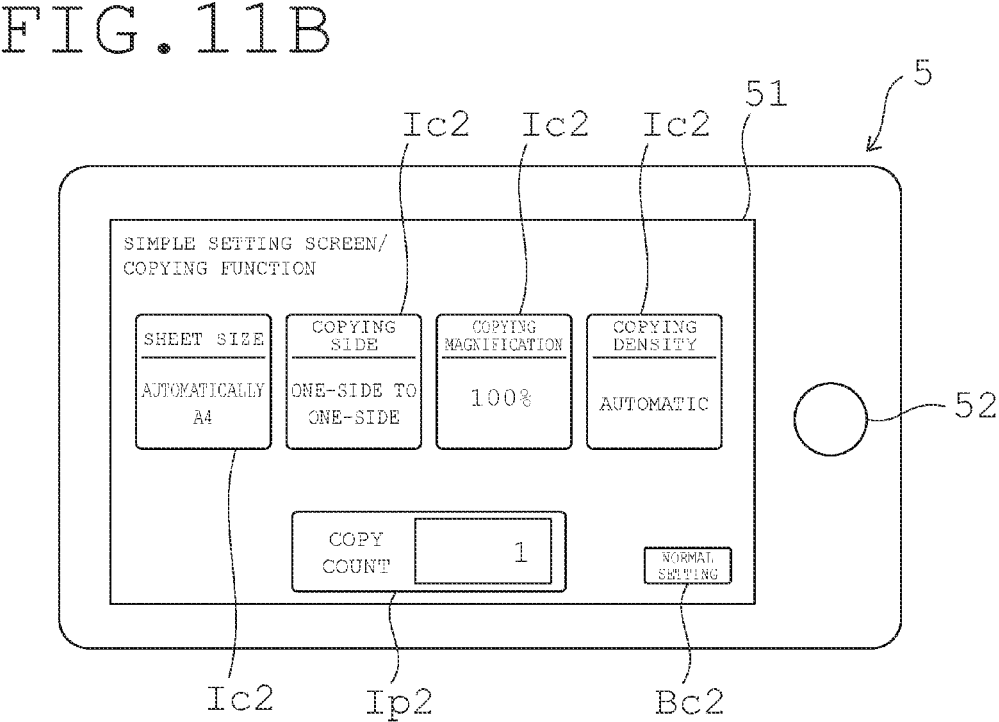

FIG. 11A shows an instance where a copying magnification is set at 80% and a copying color is set at monochrome on the normal setting screen. FIG. 11B shows an instance where a display screen is switched to the simple setting screen after the operating conditions are set on the normal setting screen. As shown in FIGS. 11A and 11B, a setting indicated in the icon Ic1 corresponding to a copying magnification on the normal setting screen is 80% (see FIG. 11B), whereas a setting indicated in the icon Ic2 corresponding to a copying magnification on the simple setting screen is 100% (see FIG. 11A). This shows that even an operating condition settable on (can be reflected in) the simple setting operation is still reset. A setting for a copying color is also returned to full-color, which is a default setting.

The simple setting screen includes settable operating conditions of a number smaller than the number of settable operating conditions on the normal setting screen. Thus, resetting each setting on the simple setting screen does not force a user to perform troublesome operation again.

The operation controller 72 may perform one of the following processes relating to an operating condition having been set on the normal setting screen and settable also on the simple setting screen in response to a command entered through the touch display panel 51: reflecting a setting of this operating condition in a corresponding operating condition on the simple setting screen; and resetting the setting without reflecting the setting in the corresponding operating condition. For example, during a shift from the normal setting screen to the simple setting screen, the operation controller 72 makes the touch display panel 51 display a screen on which a user is asked to determine whether or not a setting is to be reflected. The operation controller 72 performs one of the aforementioned two processes in response to a command entered on this screen.

[4] Other Embodiments

[4-1] Fourth Embodiment

In the aforementioned second embodiment, if a display screen is switched to the simple setting screen after or while an operating condition is set on the normal setting screen, a setting of the operating condition having been set previously and not settable on the simple setting screen is reset and is returned to a default setting. This is intended to avoid troublesome operation to be involved if a setting of an operating condition that cannot be set again deviates from user's intention.

Meanwhile, a user may hope to leave a setting of an operating condition as it is intentionally, even if this operating condition cannot be set again on the simple setting screen. In this case, leaving the setting as it is without resetting the same is more preferable, as this allows the image forming apparatus to operate under the operating condition reflecting the user's intention in detail.

Thus, if an operating condition is set on the normal setting screen (see FIG. 4) and then the button Bc1 is selected on this normal setting screen to shift a display screen to the simple setting screen, the operation controller 72 may perform the following process in response to a command entered through the touch display panel 51. Specifically, the operation controller 72 may leave a setting of an operating condition as it is having been set on the normal setting operation and not settable (cannot be set again) on the simple setting screen without resetting this setting. For example, during a shift from the normal setting screen to the simple setting screen, the operation controller 72 makes the touch display panel 51 display a screen on which a user is asked to determine whether or not a setting of an operating condition not settable on the simple setting screen is to be reset. In response to a command entered on this screen, the operation controller 72 makes the shift while resetting the setting of the non-settable condition or not resetting the setting.

As another example, during a shift from the normal setting screen to the simple setting screen, the operation controller 72 may make the touch display panel 51 display a screen on which a user is asked to select a setting of an operating condition not settable on the simple setting screen and determined to be left as it is. The operation controller 72 leaves the setting of the operating condition as it is having been selected on this screen. Meanwhile, the operation controller 72 may reset the setting of a different operating condition not having been selected.

[4-2] Fifth Embodiment

Figure 12:
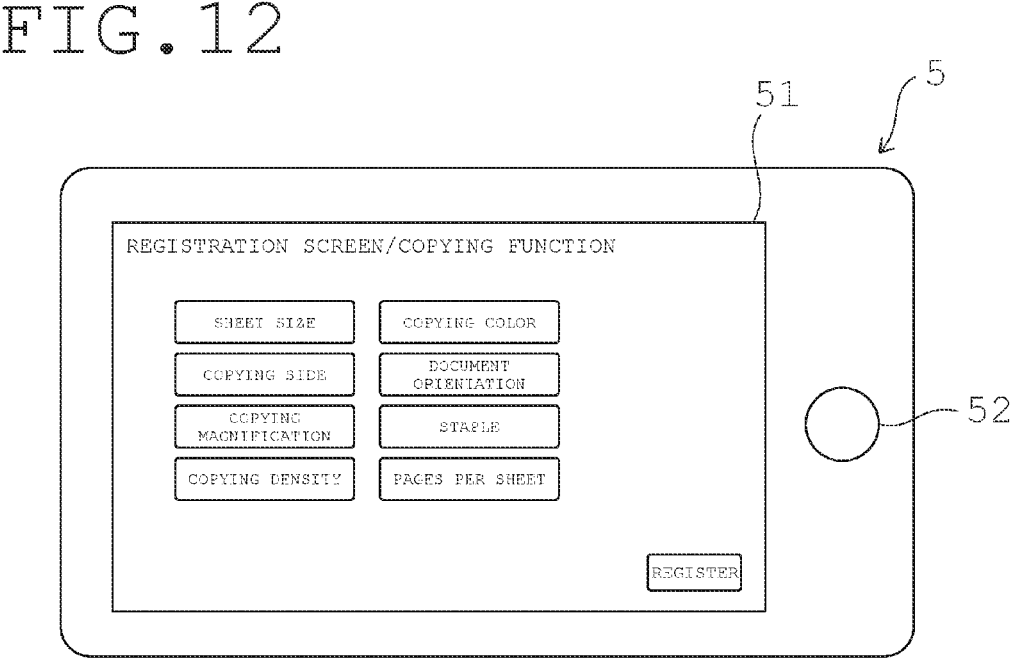
FIG. 12 is a conceptual view showing a registration screen to be displayed on the touch display panel under the command of the operation controller in a fifth embodiment.

In the aforementioned embodiments, the operation controller 72 may perform the following process in order to allow a user to register an operating condition settable on the simple setting screen. As shown in FIG. 12, the operation controller 72 first makes the touch display panel 51 display a registration screen on which each operating condition to become settable on the normal setting screen and settable also on the simple setting screen is shown in a selectable state. The registration screen shown in FIG. 12 is about a copying function and includes eight operating conditions that can be registered with the simple setting screen. These are not the only operating conditions to be displayed on the registration screen but various other operating conditions can be displayed on the registration screen.

If some or all the operating conditions displayed on the registration screen are selected on this registration screen and are decided to be employed (if a registration button of FIG. 12 is pressed), the operation controller 72 registers the selected operating condition as an operating condition settable on the simple setting screen. The registered operating condition is indicated by the icon Ic2 and becomes selectable on the simple setting screen (see FIG. 6). The simple setting screen shown in FIG. 6 is displayed if four operating conditions including a sheet size, a copying side, a copying magnification, and a copying density are selected and registered with the registration screen shown in FIG. 12.

The aforementioned process by the operation controller 72 allows a user to select and register an operating condition settable on the simple setting screen. In this way, the operating condition to be set with high frequency by the user is registered with the simple setting screen to provide the user with enhanced operability.

[4-3] Sixth Embodiment

Figure 13A:
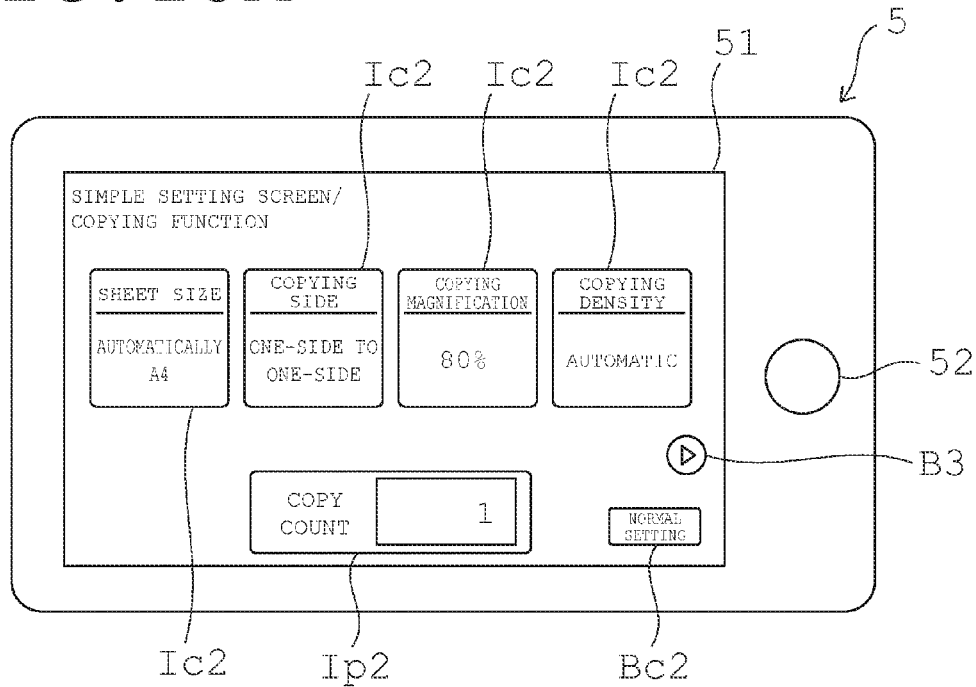
FIGS. 13A and 13B are conceptual views showing a first screen and a second screen respectively of a simple setting screen to be displayed on the touch display panel under the command of the operation controller in a sixth embodiment.
Figure 13B:
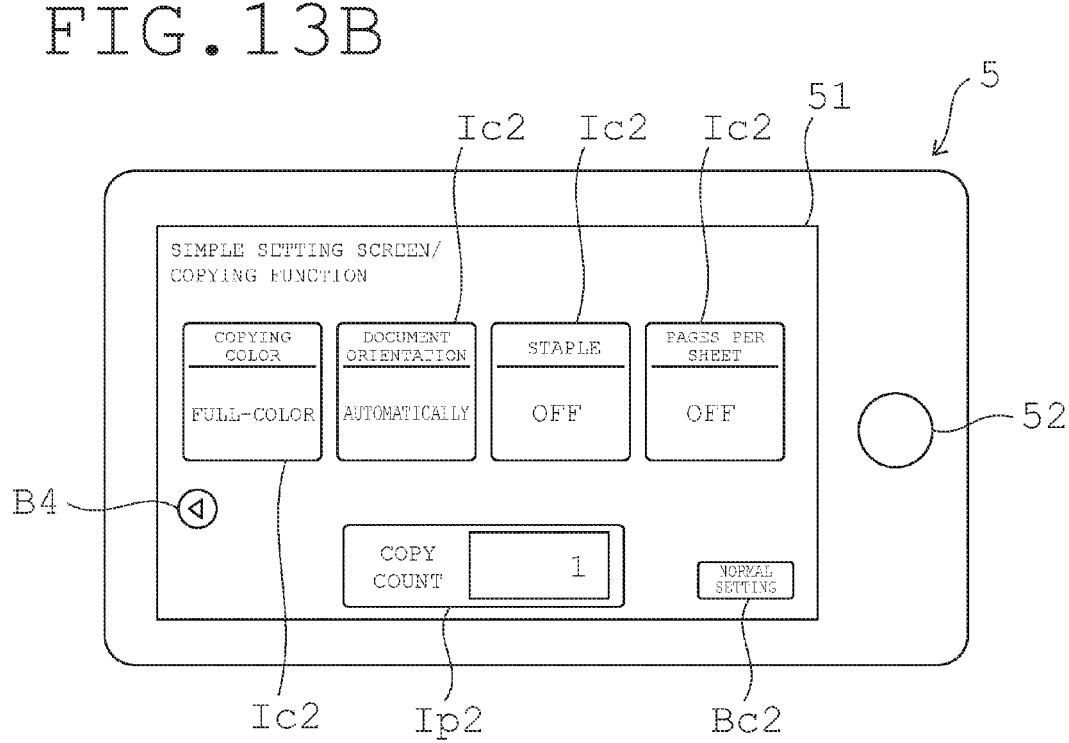

In the aforementioned image forming apparatus, the operation controller 72 may form the simple setting screen on one screen and locate all the icons Ic2 on this screen (see FIG. 6). Alternatively, the operation controller 72 may form the simple setting screen on a plurality of interchangeable screens and locate the icons Ic2 separately on these screens (see FIGS. 13A and 13B). FIGS. 13A and 13B show two screens forming the simple setting screen. Eight icons Ic2 are located separately on these screens, with four icons Ic2 on each screen. A shift between the two screens is made in response to selection of a button B3 or a button B4. The aforementioned structure of the simple setting screen and the aforementioned location of the icons Ic2 are not the only examples but various other structures and locations can be devised.

According to the aforementioned process by the operation controller 72, increase in the number of the icons Ic2 does not involve reduction in size of the icons Ic2. Thus, a plurality of icons Ic2 can be displayed on the simple setting screen without reducing the visibility of these icons Ic2.

[4-4] Seventh Embodiment

The aforementioned processes performed by the operation controller 72 may be realized by making the image forming apparatus execute a control program. Such a control program may be stored in a storage medium (such as a hard disk or a memory card) in a state of being readable by the storage medium.

It should be noted that the foregoing description of the embodiment is in all aspects illustrative and not restrictive. The scope of this invention is defined by the appended claims rather than by the embodiment described above. All changes that fall within a meaning and a range equivalent to the scope of the claims are therefore intended to be embraced by the claims.

What is claimed is:

1. An image forming apparatus having at least one function and permitting setting a plurality of operating conditions about the function,
the image forming apparatus comprising:
an operating portion used for operation of setting the operating conditions;
an image processor that performs image processing in a manner that depends on a setting of an operating condition set at the operating portion; and
a controller that controls the operating portion and the image processor,
wherein the controller performs processes of:
(i) allowing selection of one from a first setting mode and a second setting mode at the operating portion, the first setting mode allowing the operating conditions to be set at the operating portion, the second setting mode allowing only some of the operating conditions to be set at the operating portion; and
(ii) regarding an operating condition to be set in the second setting mode, making a setting of a corresponding operating condition of an operating condition having been set while the first setting mode is selected reflect in the operating condition to be set in the second setting mode, and resetting a setting of an operating condition having been set in the first setting mode but not settable in the second setting mode, if the first setting mode is selected at the operating portion, the operating condition settable in the first setting mode is set, and then the second setting mode is selected at the operating portion.

2. The image forming apparatus according to claim 1, wherein the controller performs processes of:
(I) making a display portion of the operating portion display, in a selectable state, at least one of the operating conditions to become settable in the first setting mode; and
(II) registering an operating condition having been selected at the operating portion from the at least one of the operating conditions displayed on the display portion, as an operating condition settable in the second setting mode.

3. The image forming apparatus according to claim 1, wherein
while the second setting mode is selected, a display portion of the operating portion displays icons respectively prepared for the some of the operating conditions settable in the second setting mode, and
the controller locates all of the icons on one screen to be displayed on the display portion or locates the icons separately on a plurality of screens to be displayed on the display portion in response to a command entered through the operating portion.

4. An image forming apparatus having at least one function and permitting setting a plurality of operating conditions about the function,
the image forming apparatus comprising:
an operating portion used for operation of setting the operating conditions;
an image processor that performs image processing in a manner that depends on a setting of an operating condition set at the operating portion; and
a controller that controls the operating portion and the image processor,
wherein the controller performs processes of:
(i) allowing selection of one from a first setting mode and a second setting mode at the operating portion, the first setting mode allowing the operating conditions to be set at the operating portion, the second setting mode allowing only some of the operating conditions to be set at the operating portion;
(ii) making a setting of an operating condition having been set while the second setting mode is selected reflect in an operating condition to be set in the first setting mode, if the second setting mode is selected at the operating portion, the operating condition settable in the second setting mode is set, and then the first setting mode is selected at the operating portion; and
(iii) resetting each setting of an operating condition having been set while the first setting mode is selected, without reflecting the setting in an operating condition settable in the second setting mode, if the first setting mode is selected at the operating portion, the operating condition settable in the first setting mode is set, and then the second setting mode is selected at the operating portion.

5. An image forming apparatus having at least one function and permitting setting a plurality of operating conditions about the function,
the image forming apparatus comprising:
an operating portion used for operation of setting the operating conditions;

an image processor that performs image processing in a manner that depends on a setting of an operating condition set at the operating portion; and a controller that controls the operating portion and the image processor, wherein the controller performs processes of:

(i) allowing selection of one from a first setting mode and a second setting mode at the operating portion, the first setting mode allowing the operating conditions to be set at the operating portion, the second setting mode allowing only some of the operating conditions to be set at the operating portion;

(ii) making a setting of an operating condition having been set while the second setting mode is selected reflect in an operating condition to be set in the first setting mode, if the second setting mode is selected at the operating portion, the operating condition settable in the second setting mode is set, and then the first setting mode is selected at the operating portion;

wherein if the first setting mode is selected at the operating portion, an operating condition settable in the first setting mode is set, and then the second setting mode is selected at the operating portion, the controller performs one of processes (iii) and (iv) in response to a command entered through the operating portion:

(iii) regarding an operating condition to be set in the second setting mode, making a setting of a corresponding operating condition of the operating condition having been set while the first setting mode is selected reflect in the operating condition to be set in the second setting mode; and (iv) resetting each setting of the operating condition having been set while the first setting mode is selected, without reflecting the setting in an operating condition settable in the second setting mode.

* * * * *